_United States Patent Office_

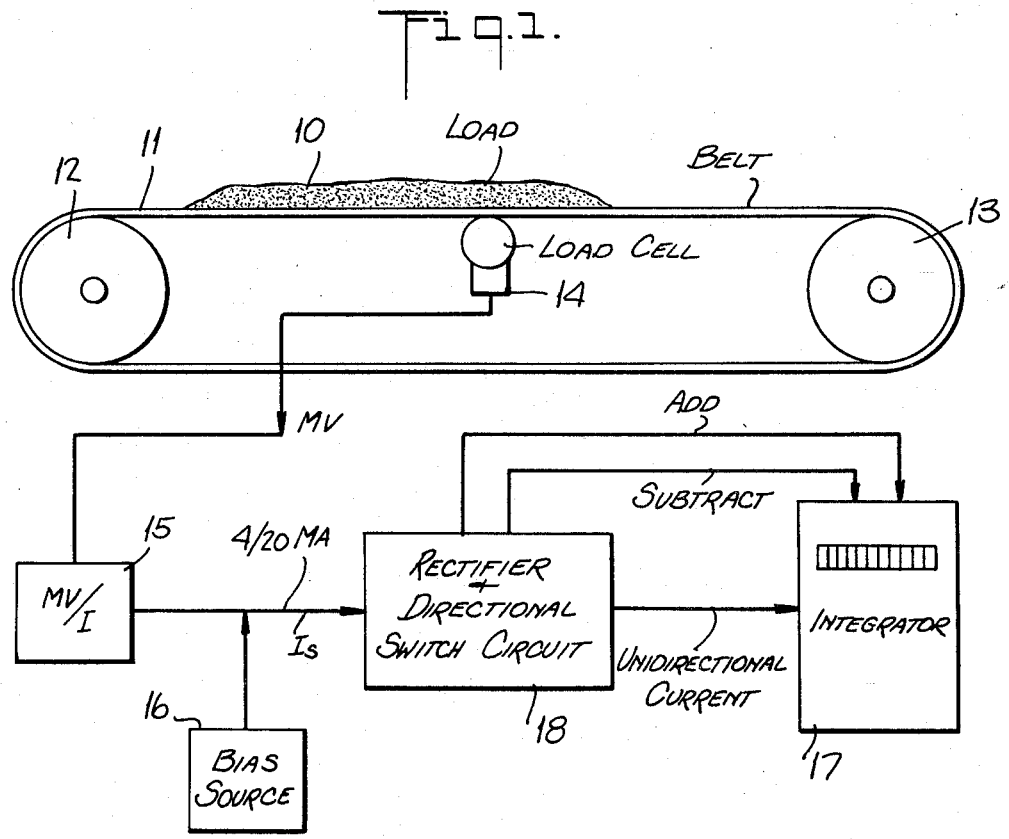
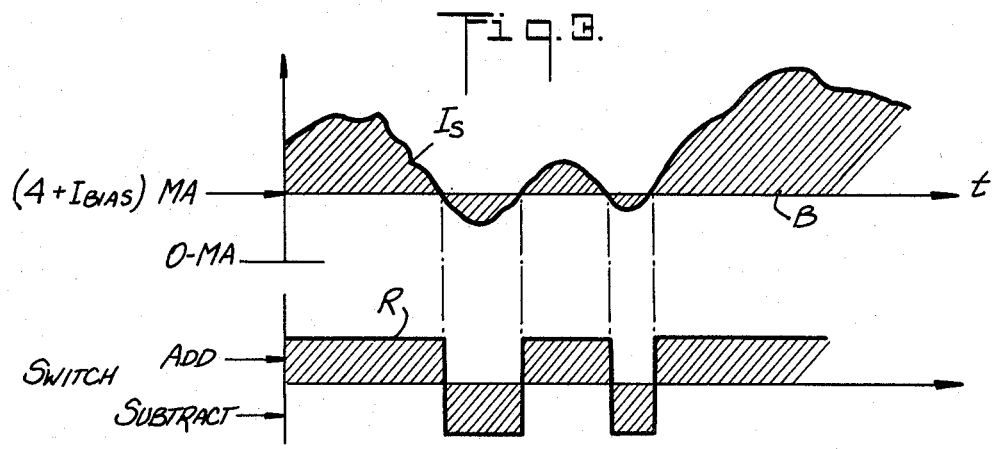

3,478,830
Patented Nov. 18, 1969

3,478,830
CONVEYOR BELT WEIGHING SYSTEM
Peter S. Levesque, Warminster, and William K. Haeflein, Doylestown, Pa., assignor to Fischer & Porter Co., Warminster, Pa., a corporation of Pennsylvania
Filed Dec. 15, 1967, Ser. No. 690,913
Int. Cl. G01g *11/14*
U.S. Cl. 177—16       5 Claims

ABSTRACT OF THE DISCLOSURE

A conveyor belt weighing system in which a load cell is disposed below a section of a belt serving to convey material, the cell producing a voltage proportional to the load imposed by the belt section and the material loaded thereon. This voltage is converted into a current from which is subtracted a bias current whose level is scaled in accordance with the average weight of the belt, the resultant current signal being dependent solely on the instantaneous weight of the material on the belt section. The current signal is applied to an integrator to register the totalized quantity of material. Since the weight of the belt actually varies about its average value, the current signal is sometimes negative, and to afford accurate readings, a bi-directional arrangement is provided to cause the integrator to add on the positive portions of the current signal and to subtract the negative portions thereof.

---

Figure 2:
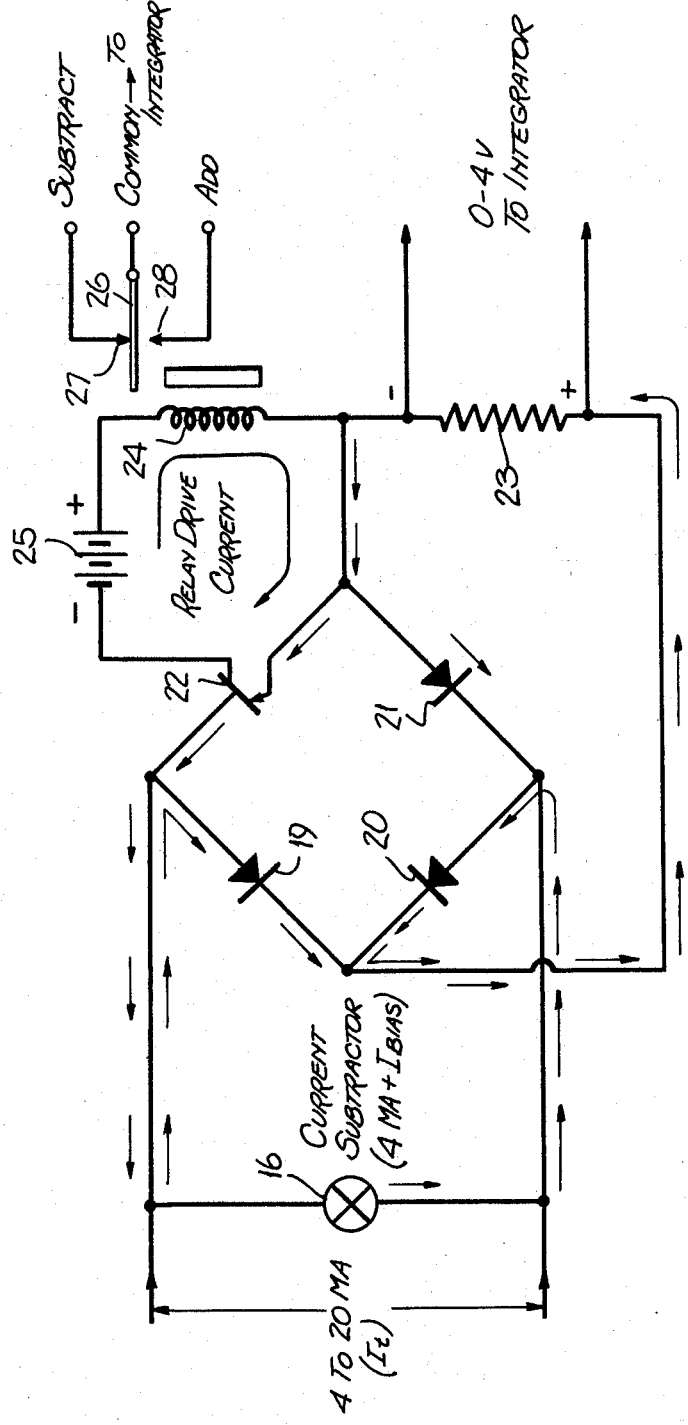

This invention relates generally to conveyor belt weighing systems, and more particularly to a system adapted to totalize the quantity of material transported by the belt and to provide accurate readings thereof despite variations in the weight of the belt.

In many industrial systems, it is necessary to automatically and continuously weigh bulk material in transit. For this purpose, it is known to use a weighing scale in the form of a load sensing transducer, such as a strain gauge or a pressure-responsive device whose output voltage has a magnitude which represents the instantaneous weight of the total load imposed on the transducer. This total load depends on the weight of the belt section imposed on the transducer as well as the weight of the material thereon.

The output voltage of the transducer is converted into a current signal which is applied to an integrator acting to register the totalized quantity of material being transported on the belt. In order to obtain a reading which reflects only the quantity of the material, it is necessary to deduct from the transducer current signal applied to the integrator, the tare component resulting from the presence of the belt. This is accomplished at the integrator by subtracting from the current signal a bias current whose value represents the average belt weight. The resultant signal, hereinafter designated $I_s$, represents only the instantaneous weight of the material imposed on the transducer. Integration of signal $I_s$ then yields the totalized quantity of the material on the belt.

If the belt weight were a constant over a complete cycle, the arrangement wherein a fixed bias current is subtracted from the varying current signal derived from the transducer would provide accurate readings. However, the weight of the belt is known to vary about its average value, such that with light sections of the belt, there are moments in the course of a cycle when the signal $I_s$ may become negative in that the tare bias current representing the average belt weight is then greater than the output current derived from the transducer. Electronic integrators cannot accommodate an input less than zero, but are responsive only to positive values. Hence, unless some provision is made to take into account negative values of $I_s$, the totalized output of the integrator is inaccurate.

Accordingly, it is the main object of this invention to provide a conveyor belt weighing system which provides an accurate reading despite variations in the weight of the conveyor belt.

More specifically, it is an object of the invention to provide a system of the above type wherein bi-directional (add/subtract) totalization is effected to register minus as well as plus counts, whereby the integrator acts effectively to totalize $I_s$ in the negative as well as in the positive direction.

Briefly stated, these objects are accomplished by means of a transducer disposed below a section of the conveyor belt and responsive to the material load imposed on the belt as well as the weight of the belt, to produce an output voltage that is converted into a current signal which varies as a function of the instantaneous weight of the load and the changing weight of the moving belt sections, the transducer current signal and a tare current bias representing the average weight of the belt section being applied to the input diagonals of a full-wave rectifying bridge in subtractive relation. In the bridge, three of the arms are composed of diodes, the fourth arm being in the form of a transistor switch whose emitter-base junction functions as a diode in the bridge, the output diagonals of the bridge being coupled to an output resistor to effect cross-zero integration.

Since the bias current is substracted from the signal current, the resultant current ($I_s$) applied to the input diagonals of the bridge, depending on variations in the actual weight of the conveyor section, is sometimes negative, and hence is an alternating-current wave having positive and negative portions. However, the current flowing through the resistor coupled to the output diagonal of the full-wave rectifier is unidirectional and provides an absolute value for $I_s$, regardless of changes in the sense thereof. The transistor switch is coupled to a relay which is rendered operative only when $I_s$ is positive. The relay is coupled to the electromechanical counter in the integrator to establish the direction of totalization, adding being in force when $I_s$ is positive, and substraction being effected when $I_s$ is negative. In this way, the totalized value reflects the weight of the load from which the actual weight of the conveyor belt is deducted.

For a better understanding of the invention, as well as other objects and further features thereof, reference is made to the following detailed description to be read in conjunction with the accompanying drawing, wherein:

FIG. 1 schematically illustrate a conveyor belt weighing system in accordance with the invention;

FIG. 2 is a schematic diagram of the fullwave rectifying and polarity-determining switching circuit included in the system; and FIG. 3 graphically illustrates the changing values of $I_s$ in the course of operation and its effect on the polarity-determining switch.

Referring now to FIG. 1, there is shown a conveyor belt weighing system in accordance with the invention, wherein bulk material, designated by numeral 10, is transported by a continuous conveyor belt 11, supported for movement between suitable rollers 12 and 13. Mounted below a section of the belt is a transducer or load cell 14 which acts as a weighing scale to provide an output voltage reflecting the total load imposed thereon. The total load includes the weight of the belt section as well as the material thereon, the combined weight applying a downward force on the cell.

The cell may be any suitable form of transducer, such as a strain gauge, which is stressed in accordance with the total load. Thus the total load is converted into proportional values of voltage which in practice lie in the millivolt range.

The output voltage of load cell 14 is converted into corresponding current values by means of millivolt-to-current converter 15 of any standard design, such as a transistor circuit whose internal impedence is caused to vary as a function of the applied voltage to provide a varying current output. In practice, converter 15 may be designed to operate in the 4 to 20 ma. range. The output current $I_t$ of the cell represents the total load.

In order to provide a signal $I_s$ which represents only the material 10 being weighed, a 4 ma.$+I$ bias current taken from source 15 is subtracted from current $I_t$, this bias being scaled to represent the average belt weight. Thus the average tare value is deducted from the total load to provide current signal $I_s$. Integration of $I_s$ would yield the totalized quantity of material transported on the belt, if the belt weight were a constant over a complete cycle. However, since the belt weight is known to vary about its average, the current signal $I_s$, is the algebraic resultant of the total load current and the bias current subtracted therefrom is sometimes negative. Mathematically, this is precisely what is desired in order to obtain accurate totalization. However, electronic integrators cannot accommodate inputs less than zero.

In order, therefore, to provide absolute values applicable to the electronic integrator 17, which may be of conventional design and which includes an electromechanial counter, a rectifying and directional switch circuit 18 is provided. This circuit, whose details are shown schematically in FIG. 2, includes a full-wave rectifier bridge having four arms, three of which include diodes 19, 20 and 21, respectively. In the fourth arm, there is disposed the emitter-base junction of a transistor 22 which, to the extent that it lies within the bridge, acts as a unidirectional device or diode to effect rectification.

Applied to the input diagonals of the rectifying bridge are the total load current $I_t$ from the output of the mv./$I$ converter 15, and the tare current bias from bias source 16, which is subtracted from $I_t$ to provide the current signal $I_s$, which depends only on the weight of the material.

As shown graphically in FIG. 3, current $I_s$ flows above and below the horizontal line B which is the level of the tare bias scaled to represent the average belt weight. Since, as pointed out previously, the belt weight actually varies above and below its average, current signal $I_s$ will sometimes become negative. In FIG. 3, this is shown to occur twice. Thus $I_s$ is an alternating wave with negative and positive portions.

However, with full-wave rectification of $I_s$ the current flowing through the output resistor 23 connected to the output diagonals of the bridge is always in the same direction. Assuming a resistor whose value is 250 ohms, by passing $I_s$ through the full-wave rectification system so that the negative portions thereof in the rectifier output are now in the same sense as the positive portions, a value $E_s^1$ will be obtained across resistor 23, where $E_s^1$ is the absolute value of $I_s$ times 250 ohms.

In order to cause the integrator to register plus counts when value $E_s^1$ reflects the positive portions of $I_s$, and to register minus when value $E_s^1$ reflects negative portions of $I_s$, a directional switch is provided in the form of a relay whose solenoid 24 is connected between the collector and emitter electrodes of transistor 22 in series with a battery or DC source 25. Since transistor 22 is conductive only during the positive portions of current $I_s$ applied to the rectifying bridge, relay solenoid 24 will be energized only during these positive portions to cause the armature 26, which normally engages the upper fixed contact 27, to then engage the lower fixed contact 28.

When, therefore, upper contact 27 is engaged, this indicates that a negative portion of $I_s$ is present, and when lower contact 28 is engaged, this indicates that a positive portion is present. By connecting these switch contacts to the bi-directional electromechanical counter in the totalizer, the direction of totalization is so established that it adds on the positive and subtracts on the negative portions of current signal $I_s$. The relationship of the positive and negative portions of current signal $I_s$ to the switching action is shown in FIG. 3, wherein the rectangular wave R is positive-going during the positive portions in the current wave, and negative-going during the negative portions.

The mathmetical analysis of the above operation is as follows:

$$f_3(t) = f_1(t) + f_2(t)$$

where:

$f_1(t)$ represents the weight of material on the belt.
$f_2(t)$ represents the belt weight.
$f_3(t)$ represents the transmitted signal.

The subtractor performs $-f_3(t) - \lambda = f_4(t)$, where $\lambda =$ the average value of $f_3(t)$, Now, $f_4(t)\ dt$ is the desired result.

However, the electronic integrator 17 cannot accommodate inputs less than zero, so $f_4(t)$ is full wave rectified in the bridge and also caused to operate a polarity determining switch such that $f_5(t)$ is defined:

$$f_5(t) = \begin{cases} (|f_4(t)|, \text{ON}); & f_4 > 0 \\ (|f_4(t)|, \text{OFF}); & f_4 < 0 \\ (0 \text{ indeterminent}); & f_4 = 0 \end{cases}$$

The counter adds counts from the integrator output when $f_5(t)$ is on, and subtracts when $f_5(t)$ is off. Then, $$\begin{aligned} N_{out} &= \int f_5(t)\,dt \\ &= \int f_4(t)|dt - \int |f_4(t)|dt \\ & \quad f_4(t) > 0 \quad\ f_4(t) < 0 \\ &= \int f_4(t) \Big|_{f_4(t)>0}^{dt} - \int -f_4(t) \Big|_{f_4(t)<0}^{dt} \\ &= \int f_4(t) \Big|_{f_4(t)>0}^{dt} + \int -f_4(t) \Big|_{f_4(t)<0}^{dt} \\ N_{out} &= \int f_4(t)\,dt \end{aligned}$$

the desired result.

In practice, millivolt-to-current converted 15 may be of the commercial type disclosed in Instruction Bulletin 50EM1000 (Revision 2), published by Fischer & Porter Co., of Warminster, Pennsylvania. In the instrument disclosed in this bulletin, the DC millivolt input signal, which is derived from a millivoltage source, such as load cell 14, is applied to a measuring circuit wherein addition or subtraction is made to a suppression voltage derived from a Zener diode power supply. The summation between the input signal and the suppression voltage is applied through a network that filters out AC pickup. A feedback signal, applied through a span adjustment from a stabilized DC amplified output, is subtracted from the filtered derivation signal, producing a resultant error signal. This error signal is converted to a 60-cycle square wave AC signal and amplified. The amplified signal is demodulated and applied to the stabilized DC amplifier. By having a high-gain amplifier, a very small error signal will produce a 4 to 20 ma. DC output signal. The feedback circuit minimizes variations in amplifier output due to aging of components or to changes in ambient conditions.

In practice, electronic integrator 17 may be of the commercial type disclosed in Instruction Bulletin 52 ET1000 (Revision 2), also published by the Fischer & Porter Co. The operation of this instrument is based on the integrating capability of an operational amplifier and utilizes a high-gain amplifier module as the active element. In order to keep the summing junction voltage at zero, the amplifier must force a charging current into a feedback capacitor that is equal to the current through the input resistance. That is, the output voltage increases or decreases at a rate proportional to input voltage, hence the output is proportional to the integral of the input. The input signal may be a direct current of magnitude 4 to 20 ma., derived from circuit 18 (FIG. 1) representative of the load on the conveyor, the output of the integrator being indicated on a digital counter.

While there has been shown and described a preferred embodiment of conveyor-belt weighing system in accordance with the invention, it will be appreciated that many changes and modifications may be made therein without, however, departing from the essential spirit of the invention.

What we claim is:

1. A conveyor belt weighing system wherein material is transported by a moving belt, said system comprising:
   (a) a load cell disposed below a section of the belt,
   (b) means to derive from the cell a current whose level is proportional to the total load imposed by said belt section and the material thereon,
   (c) means to subtract from the total load current a fixed current bias which is scaled in accordance with the average weight of the belt to produce a current signal which reflects solely the instantaneous weight of the material and is sometimes negative,
   (d) a bi-directional integrator capable of adding and subtracting,
   (e) full-wave rectifying means to derive from said current signal an absolute voltage whose value is independent of the signal polarity,
   (f) means to apply said absolute voltage to said integrator, and
   (g) switch means responsive to said rectifying means and coupled to said integrator to cause said integrator to add during the positive portions of said current signal and to subtract during the negative portions thereof.

2. A system as set forth in claim 1, wherein said cell is a transducer which yields a voltage proportional to the total load, and further including a voltage-to-current converter coupled to said cell to derive a current whose level varies in accordance with said total load.

3. A system as set forth in claim 1, wherein said cell is a strain gauge.

4. A system as set forth in claim 1, wherein said rectifying means is a solid-state bridge rectifier.

5. A system as set forth in claim 4, wherein one arm of said bridge includes a transistor which functions therein as a diode, the emitter-collector circuit of said transistor being connected to a relay which actuates said switching means.

References Cited

UNITED STATES PATENTS

| | | |
|---|---|---|
| 2,990,937 | 7/1961 | Goslin. |
| 2,997,175 | 8/1961 | Gordon. |
| 3,115,201 | 12/1963 | Brumbaugh _____ 177—16 |
| 3,333,649 | 8/1967 | Schafstaller _____ 177—16 X |

ROBERT S. WARD, JR., Primary Examiner

G. H. MILLER, JR., Assistant Examiner

U.S. Cl. X.R.

73—194; 177—210; 198—39